United States Patent [19]
Turpin et al.

[11] Patent Number: 5,971,002
[45] Date of Patent: Oct. 26, 1999

[54] SAFETY VALVE FOR A CIRCUIT FOR VENTILATING A LIQUID TANK

[75] Inventors: Jacques Turpin, Carquefou; Serge Percebois, Courbeveille, both of France

[73] Assignee: Solvay (Société Anonyme), Brussels, Belgium

[21] Appl. No.: 08/838,687

[22] Filed: Apr. 9, 1997

[30] Foreign Application Priority Data

Apr. 22, 1996 [BE] Belgium ............................. 09600350

[51] Int. Cl.⁶ ............................. F16K 17/36; F16K 24/04
[52] U.S. Cl. ............................................. 137/43; 137/202
[58] Field of Search ....................... 137/43, 202

[56] References Cited

U.S. PATENT DOCUMENTS

| | | |
|---|---|---|
| 3,765,435 | 10/1973 | Schlanzky . |
| 4,655,238 | 4/1987 | Szlaga ........................................ 137/43 |
| 4,886,089 | 12/1989 | Gabrlik et al. . |
| 5,782,258 | 7/1998 | Herbon et al. ............................. 137/43 |

FOREIGN PATENT DOCUMENTS

| | | |
|---|---|---|
| 0336788 | 10/1989 | European Pat. Off. . |
| 2606856 | 5/1988 | France . |
| 4121324 | 1/1993 | Germany . |

Primary Examiner—Gerald A. Michalsky
Attorney, Agent, or Firm—Venable; George H. Spencer; Catherine M. Voorhees

[57] ABSTRACT

A safety valve for a circuit for ventilating a liquid tank, preventing liquid from being entrained and comprising a casing which opens out inside the tank under the upper wall of the latter and the upper part of which is connected to the ventilating circuit by means of an orifice, including:

a) a needle capable, in the high position, of shutting off the orifice located in the head of the valve;

b) a float associated with the needle and capable of sliding vertically inside the casing;

c) structure for supporting the float and for displacing the said float upwards in the event of an inclination of the casing;

d) a stem extending the lower part of the casing inside the tank under the means for supporting and displacing the float.

10 Claims, 3 Drawing Sheets

SAFETY VALVE FOR A CIRCUIT FOR VENTILATING A LIQUID TANK

FIELD OF THE INVENTION

The present invention relates to a safety valve for a circuit for ventilating a liquid tank, especially a fuel tank capable of equipping a motor vehicle.

TECHNOLOGY REVIEW

Liquid tanks, especially fuel tanks for motor vehicles, are nowadays usually provided, inter alia, with a ventilating circuit. This circuit makes it possible to introduce air into the tank in the event of underpressure (particularly for compensating the volume of liquid consumed) or to discharge the gases contained in the tank in the event of overpressure (particularly in the case of heating). This circuit also makes it possible to channel and, where appropriate, filter the gases to be discharged into the atmosphere, in order to meet the relevant environmental requirements, which are increasingly strict.

The ventilating circuit comprises, in a known way, a safety valve which as far as possible prevents the escape of liquid coming from the tank in the event of the overturning or excessive inclination of the tank. This safety valve must afford a rapid and reliable response when the conditions for it to take effect occur, but with minimal sensitivity to abnormal phenomena, such as, in particular, very high flow rates, overpressures in the tank or waves of low amplitude.

Many safety valves employ a float comprising an upper needle which shuts off a connecting orifice between the tank and the ventilating circuit. These elements alone do not make it possible to satisfy all the requirements mentioned above.

It is known to add to them one or more elastic calibrating means, especially springs, but such assemblies do not satisfactorily meet requirements demanded, particularly in that there is still a risk of undesirable shut-off under severe conditions, which may cause the equilibrium of the forces put in to play to break down, for example in the event of high overpressure in the tank.

It is also known, particularly from U.S. Pat. No. 3,765,435, to associate with the float a ball which is capable of being displaced on an inclined plane pierced with a plurality of orifices and which, in principle, makes it possible to drive the float upwards and, by means of a needle, to shut off an upper connecting orifice between the tank and the ventilating circuit in the event of an inclination of the tank. Such a system nevertheless remains highly sensitive to abnormal phenomena, such as those mentioned above.

SUMMARY OF THE INVENTION

The object of the invention is, therefore, to provide a safety valve for a circuit for ventilating a liquid tank, preventing liquid from being entrained and having minimal sensitivity to abnormal phenomena, such as those mentioned above.

To this effect, the invention relates to a safety valve for a circuit for ventilating a liquid tank, preventing liquid from being entrained and comprising a casing which opens out inside the tank under the upper wall of the latter and the upper part of which is connected to the ventilating circuit by means of an orifice, comprising, a) a needle capable, in the high position, of shutting off the orifice located in the head of the valve;

b) a float associated with the needle and capable of sliding vertically inside the casing;

c) means for supporting the float and for displacing the said float upwards in the event of an inclination of the casing;

d) a stem extending the lower part of the casing inside the tank under the means for supporting and displacing the float.

DETAILED DESCRIPTION OF THE INVENTION

Figure 1:
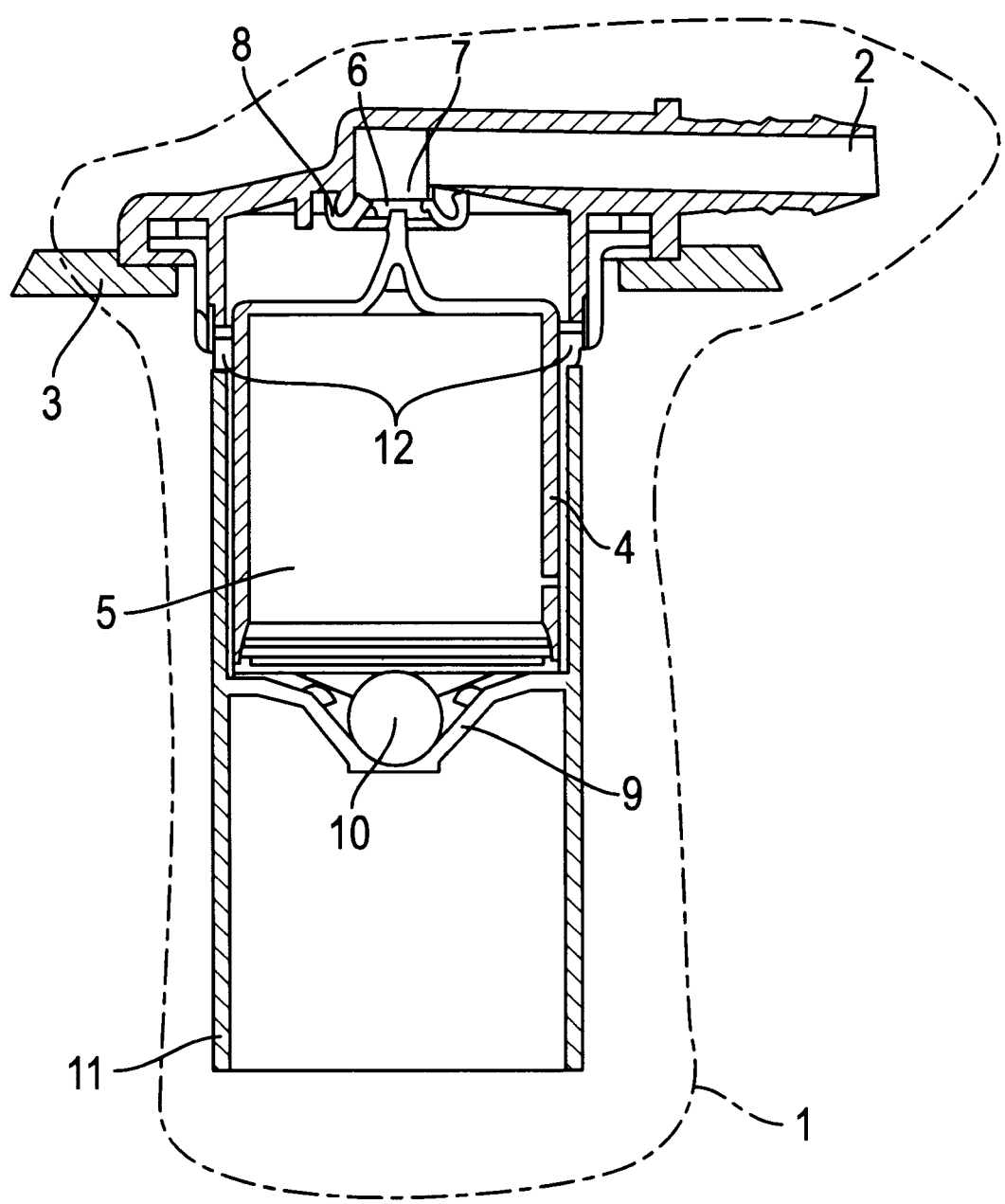
FIG. 1 shows a safety valve according to the invention in the open position.

The safety valve is intended for the circuit for ventilating a tank capable of containing any liquid. In particular, the liquid can be a fuel, a brake fluid or a lubricant. More particularly, the liquid is a fuel. The tank can be intended for any use, especially for equipping a vehicle and, more especially, for equipping a motor vehicle.

The casing can have any shape, often adapted internally to the sliding of the float. Most often, it has, for this purpose, a constant inner cross-section, at least in the part where the float must be capable of sliding. It is, in particular, at least in this part, internally cylindrical.

The external shape of the float is, of course, adapted to that of the interior of the casing where it must be capable of sliding. In particular, therefore, it is externally cylindrical.

The float is associated with the needle in any conventional way. Preferably, it is integral with the needle. The float and the needle can be produced in one piece or be produced separately and assembled.

The needle can advantageously be equipped with a gasket, for example with an elastomeric diaphragm gasket, assisting the sealing of the valve in the closed position.

The orifice located in the head of the valve makes it possible, when shut off, to close the valve. This orifice may likewise or alternatively be equipped with a gasket, for example with a flat gasket of the elastomeric diaphragm type.

The stem extends the lower part of the casing inside the tank under the means for supporting and displacing the float. The said stem makes it possible to channel the stream of fuel and to obtain the sensitivity necessary for the valve to operate properly. It protects the moveable elements of the valve, in particular the float, from the essentially lateral waves of high amplitude which could destabilize them, delay the closing of the valve and thereby cause liquid to be entrained into the ventilating circuit. The valve is thus made insensitive to this problem, and its functioning is thereby appreciably improved.

The height of the stem can be adapted to each particular case according to the amplitude of the abnormal phenomena to which the valve is to be made insensitive. In view of this dimensioning, account will, of course, also be taken of the exact position of the valve in the tank and of the effects which the possible proximity of other elements, such as, for example, a wall of the tank, may induce.

The safety valve makes it possible to ventilate a liquid tank in the way described above. It does not, as such, have the function of preventing the overfilling of the tank. Consequently, where appropriate, this function must be performed by an independent device or by additional means which will be associated with the valve. The characteristics of the valve, especially the height of the stem, are therefore not dictated by the function of preventing overfilling.

The means for supporting the float and for displacing the said float in the event of an inclination of the casing may be of any known type. Advantageously, they comprise a ball of high-density material which is capable of being displaced by gravity in a perforated frustoconical cup. By perforated, it is meant that a plurality of apertures are made in the cup, which allow liquid to pass through the cup. In particular, the frustoconical cup comprises a central orifice.

In the event of an inclination of the tank, the ball is displaced in the frustoconical cup, drives the float upwards and causes the orifice in the head of the valve to be shut off by the needle, even before the level of liquid rises in the valve, thus completely preventing liquid from passing into the ventilating circuit.

In the event that the tank is overturned, the ball of high-density material likewise pushes the float towards the valve-closing position and keeps it in this position by gravity.

In the event of a rise in the level of liquid in the tank, this liquid enters the valve via the lower part through the apertures of the frustoconical cup, drives the float upwards and likewise causes the orifice located in the head of the valve to be shut off by the needle.

In a preferred embodiment, the casing comprises, in its upper part, one or more lateral apertures allowing the passage of the gases. More preferably, the casing comprises, in its upper part, a plurality of lateral apertures allowing the passage of the gases. Advantageously, the lateral apertures are calibrated in small dimensions, so as to prevent the passage of significant flows of liquid, especially due to throttling. These apertures may, for example, be produced on a circuit provided with one or more baffles or in the form of a labyrinth. In particular, these apertures are of elongate rectangular cross-section. Advantageously, these apertures number at least 2, even more advantageously at least 4. Preferably, their number does not exceed 8. These apertures as a whole preferably represent a total passage cross-section of at least 35 mm$^2$, even more preferably of at least 45 mm$^2$. Good results have been obtained when these apertures as a whole represent a total passage cross-section not exceeding 100 mm$^2$.

By gas is meant particularly the outside air to be introduced into the tank or the gaseous mixtures which are contained in the tank and the discharge of which is to be made possible. As regards a fuel tank, these gaseous mixtures comprise essentially air and fuel vapour.

By positioning in the upper part of the casing the apertures which allow the passage of the gases, the possible effects of the level of liquid and of its movements on these apertures are reduced very appreciably, thus allowing ventilation even in some critical situations.

Advantageously, the sliding of the float inside the casing is carried out by means of fitted guidance. Thus, the float virtually cannot be displaced at all in a direction other than the vertical direction. This fitted guidance may be brought about, in particular, by the appropriate radial dimensioning of the two parts in contact and/or by means of a set of longitudinal ribs on the float and/or on the casing.

This embodiment improves the functioning of the valve in that, by virtue of this fitted guidance, there occurs, when the level of liquid rises in the casing, a piston effect which is generated by the dynamic pressure of the fluid and which assists the upward movement of the float. By contrast, when the liquid descends again, a suction effect likewise assists the driving of the float towards its low position.

Preferably, when the needle is in the high position and shuts off the orifice, it defines a closed volume in the upper part of the casing. In the closing position of the valve, this closed gas-filled volume affords the advantage of a buffer effect preventing the liquid from approaching the ventilating orifice and, with all the more reason, escaping from the tank.

In a particular embodiment, the stem may be bevelled. In this way, where appropriate, the valve may be protected selectively against the movements of fluid coming from a particular direction.

The component elements of the valve may be produced from any material. Preferably, they are produced from a thermoplastic-based material. In this case, it is, of course, expedient to select the material or materials in such a way that they withstand the stresses of use. In particular, of course, the selected materials must be inert towards the liquids with which they are likely to be in contact, especially towards fuels.

The method and location for fastening the valve to the tank may be selected in any conventional way suitable for the specific conditions. Preferably, the valve is assembled directly on the upper wall of the tank.

The invention also relates to a tank comprising a valve, as defined above.

Figure 2:
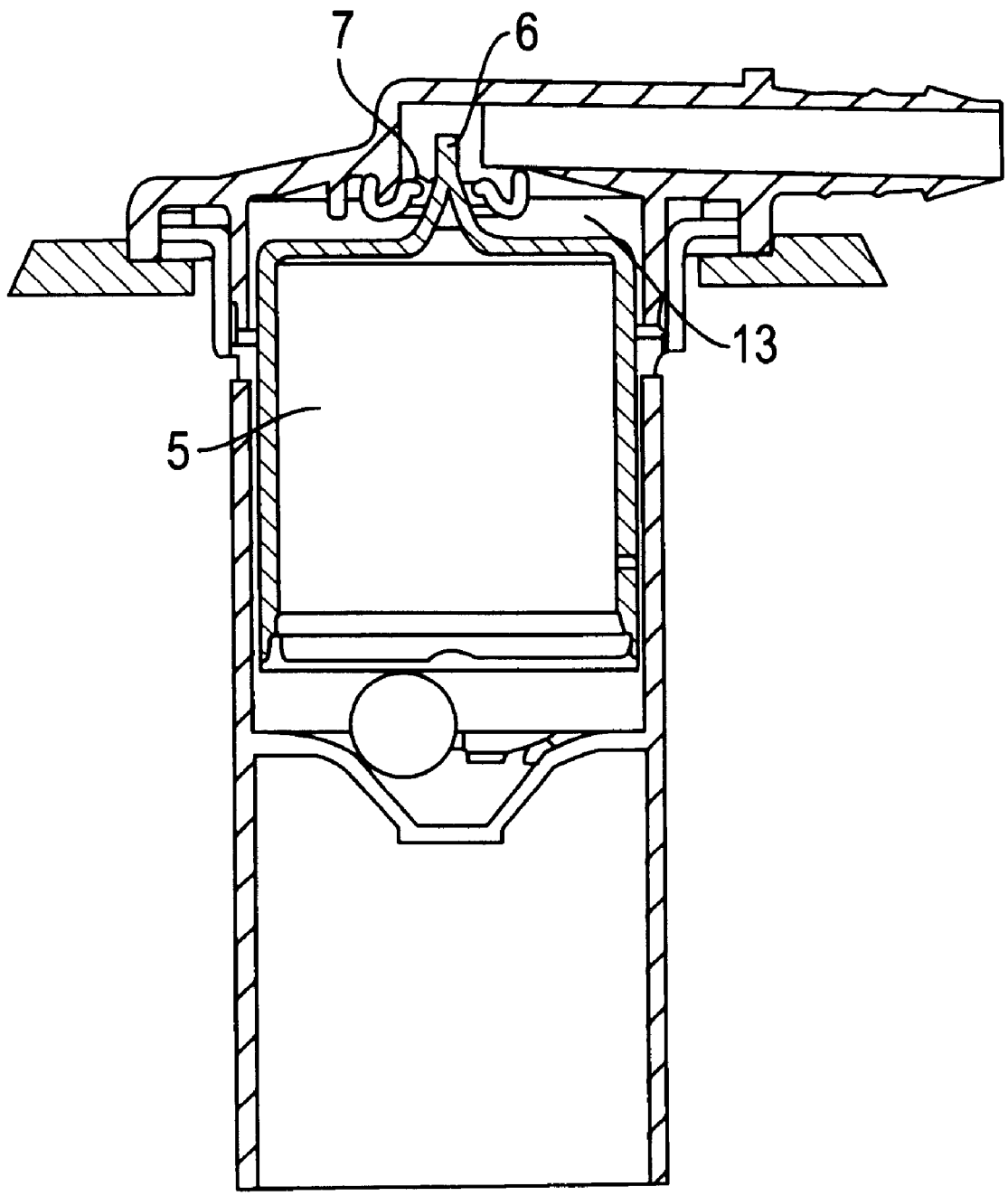
FIG. 2 shows the same valve in the closed position.

The invention is illustrated in a non-limiting way by the following figures:

FIG. 1 shows a safety valve according to the invention in the open position;

FIG. 2 shows the same valve in the closed position.

Figure 3:
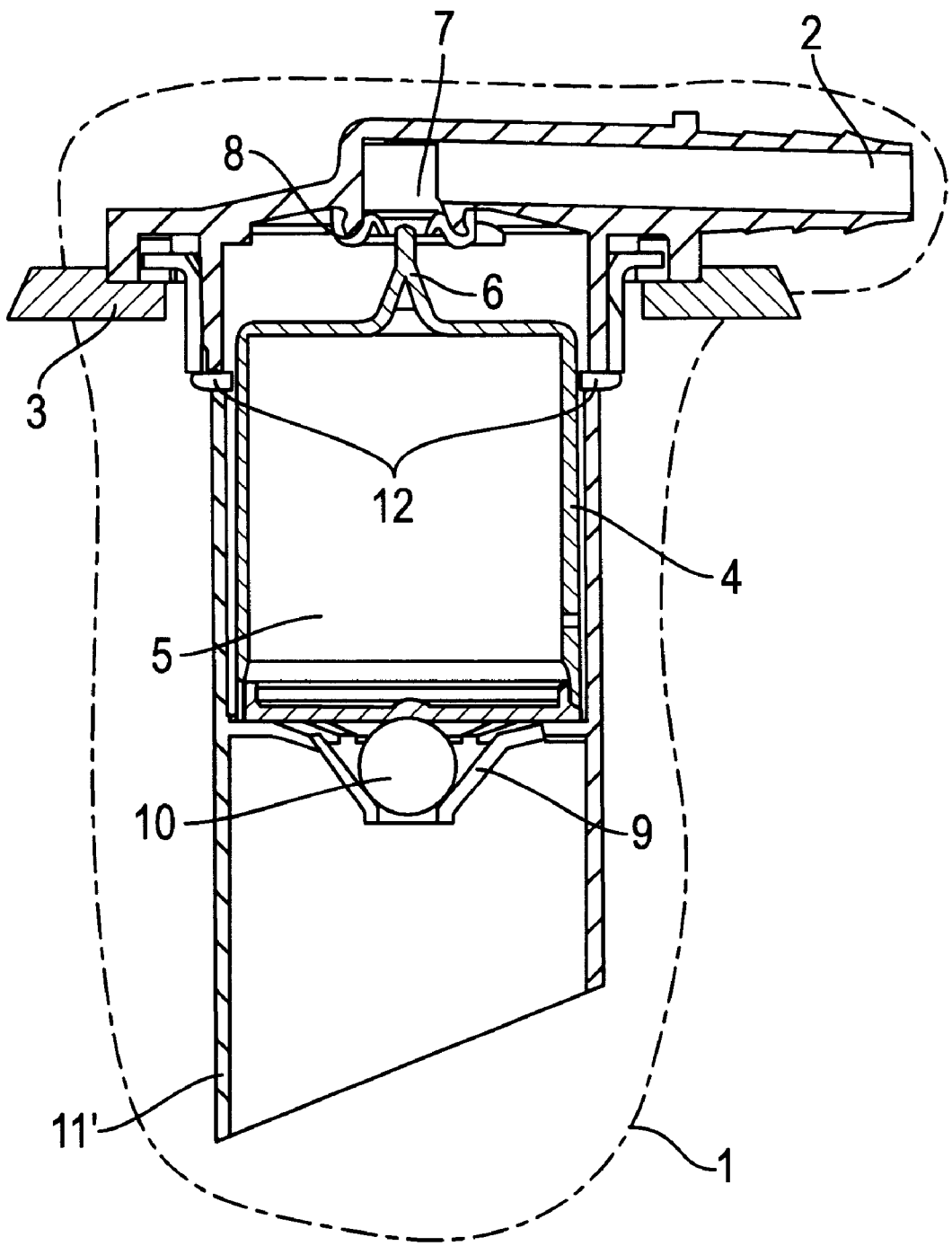
FIG. 3 shows a safety valve according to the invention with a beveled stem.

FIG. 3 shows another safety valve according to the invention with a beveled stem.

According to FIG. 1, the safety valve (1) for a ventilating circuit (2) is fastened to the upper wall of the tank (3). The safety valve (1) comprises a casing (4) which opens out inside the tank. A float (5), shown in the low position, can slide vertically in the casing (4), in order, in the high position, to shut off an orifice (7) located in the head of the valve by means of a needle (6) (produced in one piece with the float). In order to improve the sealing of the closure, the orifice (7) is provided with an elastomeric gasket (8). The float (5) can be set in motion by the rise of the liquid in the valve through the perforated frustoconical cup (9) or, in the event of the inclination of a tank, by the displacement of a ball (10) of high-density material in the frustoconical cup (9). The casing (4) is extended in its lower part by a stem (11). The said casing comprises, in its upper part, 4 lateral apertures (12) of small dimensions, allowing the passage of the gases, but preventing the passage of significant flows of liquid.

FIG. 2 illustrates the float (5) in the high position, when the needle (6) shuts off the orifice (7). A closed gas-filled volume (13) is then defined in the upper part of the casing.

FIG. 3 illustrates a preferred embodiment of the invention having a beveled stem 11'. Beveled stem 11' channels the stream of fuel in tank 3 to obtain the sensitivity necessary for the valve to operate properly. As FIG. 3 is similar to FIG. 1, the same reference numerals are used to refer to the elements which are described above with reference to FIG. 1.

What is claimed is:

1. A safety valve for a circuit for ventilating a liquid tank, preventing liquid from being entrained and comprising a casing which opens out inside the tank under the upper wall of the tank and an upper part of the casing being connected to the ventilating circuit by means of an orifice, said safety valve further comprising:

a) a needle capable, in the high position, of shutting off the orifice located in the head of the valve;

b) a float associated with the needle and capable of sliding vertically inside the casing;

c) means for supporting the float and for displacing the said float upwards in the event of an inclination of the casing;

d) a stem having an open bottom and attached to a stationary portion of the casing, said stem channeling a stream of liquid and extending from a lower part of the casing inside the tank under the means for supporting and displacing the float.

2. The valve according to claim 1, in which the means for supporting the float and for displacing the said float upwards in the event of an inclination of the casing comprise a ball of high-density material capable of being displaced by gravity in a perforated frustoconical cup.

3. The valve according to claim 1, in which the casing comprises, in its upper part; at least one lateral aperture allowing the passage of the gases.

4. The valve according to claim 3, in which the casing comprises, in its upper part, a plurality of calibrated lateral apertures of small dimensions, in order to prevent the passage of significant flows of liquid.

5. The valve according to claim 1, in which the sliding of the float inside the casing is carried out by means of fitted guidance.

6. The valve according to claim 1, in which, when the needle is in the high position and shuts off the orifice, it defines a closed volume in the upper part of the casing.

7. The valve according to claim 1, in which the stem is bevelled.

8. The valve according to claim 1, in which component elements of the valve are produced from a thermoplastic-based material.

9. A tank comprising a safety valve for ventilating said tank and preventing liquid from being entrained, said safety valve comprising:

a) a casing which opens out inside the tank under the upper wall of the tank and an upper part of the casing being connected to the ventilating circuit by means of an orifice;

b) a needle capable, in the high position, of shutting off the orifice located in the head of the valve;

c) a float associated with the needle and capable of sliding vertically inside the casing;

d) means for supporting the float and for displacing the said float upwards in the event of an inclination of the casing, said means for supporting the float being perforated;

e) a stem having an open bottom and attached to a stationary portion of the casing, said stem channeling a stream of liquid and extending from a lower part of the casing inside the tank under the means for supporting and displacing the float.

10. A safety valve for a circuit for ventilating a liquid tank, preventing liquid from being entrained and comprising a casing which opens out inside the tank under an upper wall of the tank and the upper part of the casing being connected to the ventilating circuit by means of an orifice and which includes, in its upper part, at least one lateral aperture allowing gas passage, said safety valve further comprising:

a) a needle capable, in the high position, of shutting off the orifice located in the head of the valve, defining a closed volume in the upper part of said casing;

b) a float associated with the needle and capable of sliding vertically inside the casing;

c) means for supporting the float and for displacing the said float upwards in the event of an inclination of the casing comprising a ball of high-density material capable of being displaced by gravity in a perforated frustoconical cup;

d) a beveled stem having an open bottom and attached to a stationary portion of the casing, said beveled stem channeling a stream of liquid and extending from a lower part of the casing inside the tank under the means for supporting and displacing the float.

* * * * *